H. SIDLE.
Churn.
No. 33,802.
Patented Nov. 26, 1861.
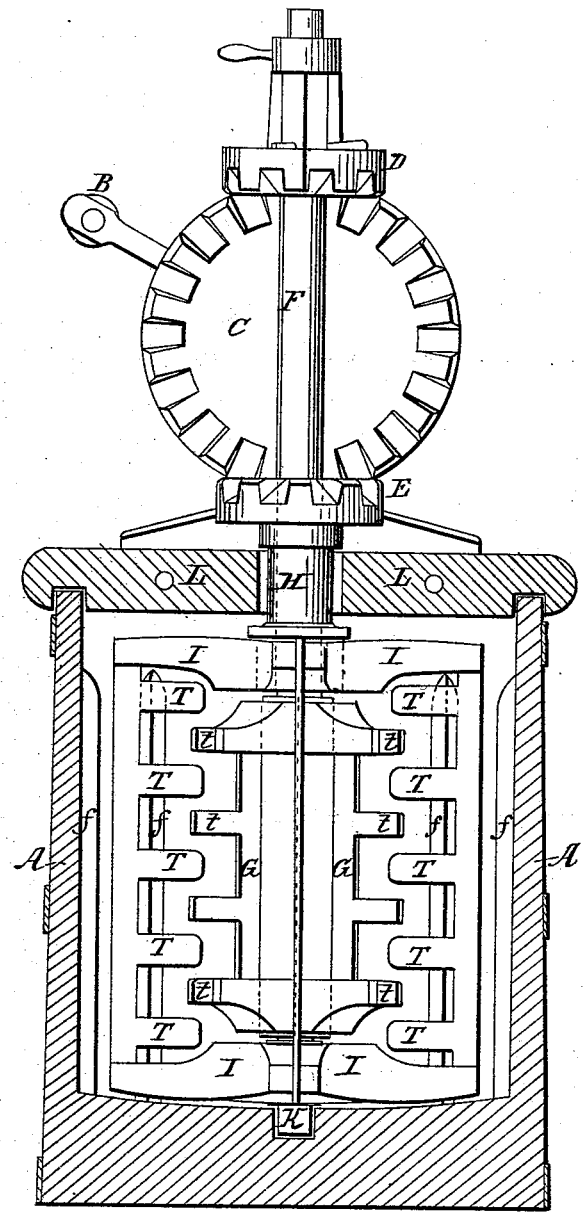
Witnesses.
E. R. Stansbury.
Inventor.
Henry Sidle
by his attorney
Chas. F. Stansbury

UNITED STATES PATENT OFFICE.

HENRY SIDLE, OF DILLSBURG, PENNSYLVANIA.

IMPROVEMENT IN CHURNS.

Specification forming part of Letters Patent No. 33,802, dated November 26, 1861.

*To all whom it may concern:*

Be it known that I, HENRY SIDLE, of Dillsburg, in the county of York and State of Pennsylvania, have invented an Improved Churn; and I do hereby declare the following to be a correct description of the same, reference being had to the accompanying drawing, which is a central vertical section of the churn.

The nature of my invention consists in combining in a churn having upright strips or fillets on the side of the cream-chamber two upright revolving dashers, moving in opposite directions and having teeth or comb-like projections upon them, said teeth being so arranged on each dasher that they shall pass between those on the other when the dashers are set in revolution. This arrangement breaks up the cream with great rapidity, facilitates the admixture of air with it, prevents its acquiring a rotation in one direction, and converts it rapidly into butter.

In the drawing, A marks the cream-chamber or receptacle; B, the crank by which cogwheel C is rotated. This wheel gears into two pinions D and E, imparting rotation in opposite directions to them. The pinion D is attached to the top of the shaft F of the inner dasher G, while the pinion E is attached to the top of the shaft H of the outer dasher I. The shaft F passes through the shaft H and moves freely in it. The teeth T of the outer dasher project inward toward the center of the cream-chamber, while those $t$ on the inner dasher project outward and play in between the teeth of the outer dasher. The lower bearing of the outer dasher G is shown at K. A cover L, divided into two parts, fits on top of the cream-chamber and is easily removable for the introduction of cream or the removal of the dashers from the chamber.

The operation is as follows: Cream being placed in the cream-chamber and the dashers introduced and fixed in their proper position, motion is given to them by turning the crank B, which rotates wheel C, which in turn drives the pinions D and E, attached to the inner and outer dasher-shafts, respectively. The cream is prevented by the fillets $f$ from revolving around the cream-chamber outside of the dashers, while the dashers themselves agitate it violently and break it up rapidly, thus greatly facilitating and expediting the production of butter.

I am aware that dashers similar to mine have before been used in churns. I am also aware that fillets or cleats have been similarly used, and therefore do not claim either of the above separately; but What I do claim, and desire to secure by Letters Patent, is—

The combination of the fillets or cleats $f$ with the dashers I and G, when the whole are arranged and constructed to operate in the manner and for the purposes described.

The above specification signed and witnessed this 10th day of April, A. D. 1861.

HENRY SIDLE.

Witnesses:
CHAS. F. STANSBURY,
E. R. STANSBURY.